Patented Oct. 12, 1937

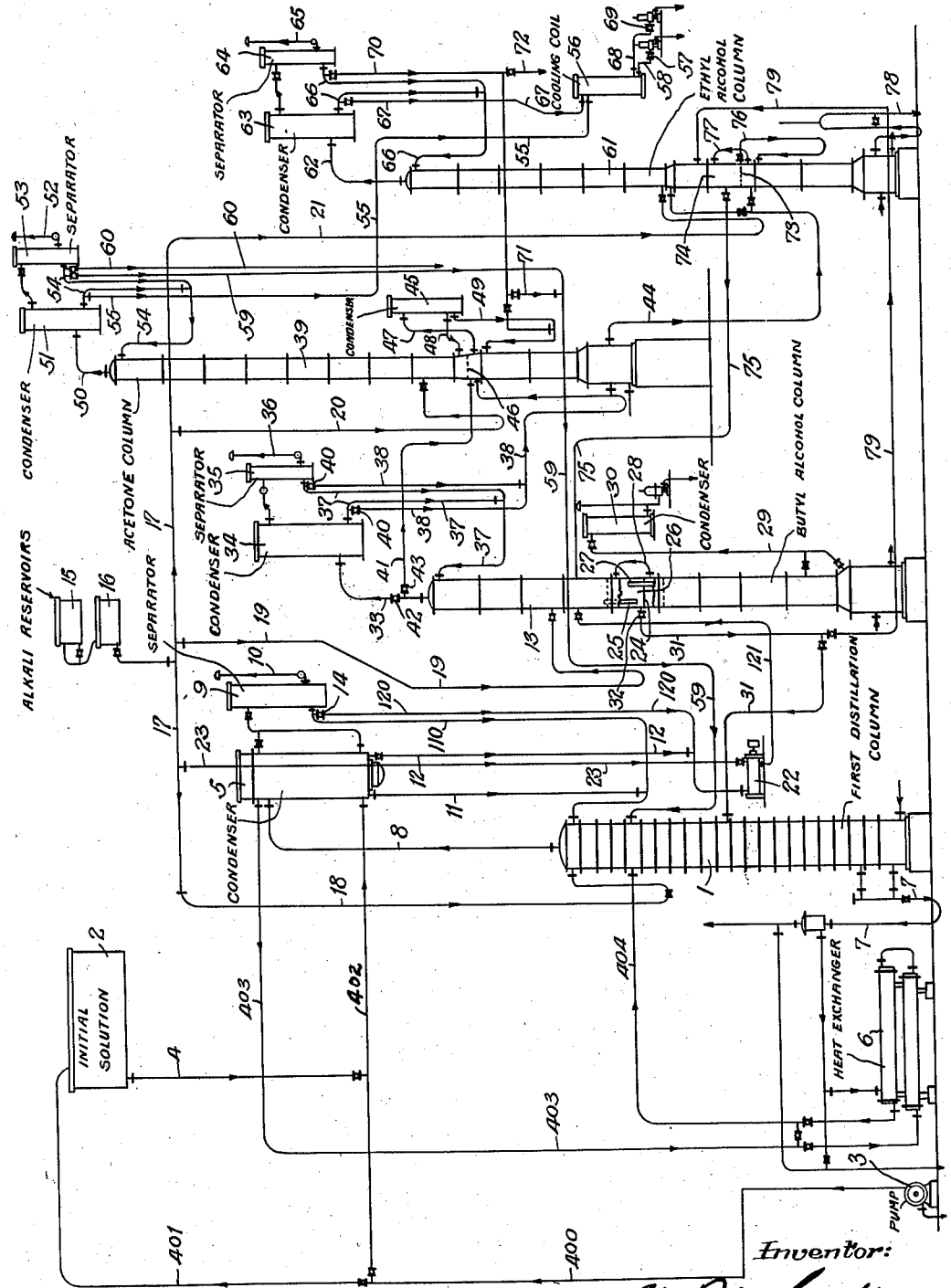

2,095,347

UNITED STATES PATENT OFFICE 2,095,347

METHOD OF AND APPARATUS FOR PREPARING IN THE PURE STATE ACETONE, ETHYL ALCOHOL, AND BUTYL ALCOHOL FROM WATERY SOLUTIONS

Georg Reichardt, Grimma, Germany, assignor to the firm Maschinenbau-Aktiengesellschaft Golzern-Grimma, Grimma, Germany Application May 9, 1933, Serial No. 670,190
In Germany May 12, 1932

8 Claims. (Cl. 202—42)

My invention relates to the preparation, in the pure state, of acetone, ethyl alcohol and butyl alcohol from watery solutions such as mash and the like.

It is an object of my invention to improve the method of such preparation and to provide an improved apparatus for performing it.

The practicability of the existing methods for preparing acetone, ethyl alcohol and butyl alcohol from a watery solution of all three components, and their economy, are largely determined by the composition of the mixtures to be treated. This is due to the solubility and vapor pressure of the system butyl alcohol and water, and to the influence exerted by the presence of acetone and ethyl alcohol whose miscibility with butyl alcohol and water is unlimited. On the other hand, the miscibility of butyl alcohol and water is limited and under certain conditions of concentration causes the formation of separate layers of the two components. The question whether the formation of such layers can be utilized for the separation, is technically and commercially important.

The percentage of butyl alcohol and water is important for the distillation of the mixture because the two components form a mixture of minimum boiling point, and this mixture can be separated from the component which is present in excess, by distillation. The residue will be water or butyl alcohol, in accordance with the composition of the initial mixture.

The azeotropic mixture of water and butyl alcohol contains about 37% water and its boiling point is 92.3 centigrade. After condensation, the mixture separates into two layers in conformity with the solubility conditions.

The methods of uninterrupted separation of acetone, ethyl alcohol, butyl alcohol and water are based on definite conditions of concentration in the initial mixture. Thus, solutions which decompose after the acetone has been eliminated, may be worked in a manner known in the art, by first distilling the acetone away from the initial solution in a fractionating column of usual type. The formation of layers which is now brought about, permits decomposing the residual liquid into a component consisting mainly of butyl alcohol, and another component of mainly watery character. The two components or layers are rectified separately in two more columns. The ethyl alcohol is obtained from the watery component while the butyl alcohol component is decomposed into an azeotropic mixture of butyl alcohol and water, and waterfree butyl alcohol.

This operation can only be performed if the residual liquid separates into two layers after the acetone has been distilled away, but this separation or decomposition does not occur in many cases, for instance, if the initial product is a mash, i. e., a solution obtained by the action of micro-organisms on carbohydrates and normally containing about 95% water. For the treatment of such solutions which is of particular technical importance, the aforesaid method is impractical but methods have also been proposed for obtaining acetone, ethyl alcohol and butyl alcohol from such principally watery solutions. In the older methods, acetone, ethyl alcohol, butyl alcohol and a certain portion of water are continuously distilled away from the watery initial solution in a column and the distillate vapors are subjected to rectification in another column directly. By these methods, crude acetone concentrate containing ethyl alcohol, and a mixture of butyl alcohol and water are obtained whose composition is about that of the azeotropic mixture. This mixture after condensation decomposes into two layers the lower, watery one of which returns into the column. The upper layer consists substantially of butyl alcohol and 15% water. The mixture which forms the upper layer, and the crude acetone, with its content of ethyl alcohol, are the products of the method.

Ethyl alcohol cannot be obtained in continuous operation. In mashes of normal composition, it is present in small quantities only and is obtained as impurity of the acetone as well as of the butyl alcohol fraction. Both distillates, for preparing pure acetone or butyl alcohol, are fractioned by separate and non-continuous processes, with or without the addition of chemicals. This method is uneconomical on account of high loss and high steam consumption.

The methods referred to and aiming at the direct separation of acetone from the initial mixture, have the drawback that the gaseous fermentation products which are present in considerable quantities in mashes, for instance, carbon dioxide and hydrogen, get into the acetone fraction, interfere with its rectification and cause loss.

The drawbacks of the aforesaid old methods are eliminated according to my invention and pure acetone, ethyl alcohol and butyl alcohol are obtained from thin watery solutions such as mashes, etc., it being understood that the term "mash" as employed herein refers to a butyl alcohol-acetone fermentation mash.

A plant in which my method is performed, will now be briefly described with reference to the accompanying drawing in which the plant has been illustrated diagrammatically by way of example.

The initial product, mash or the like, i. e., a mixture of water, acetone, ethyl alcohol and butyl alcohol, is distilled in the first column 1 to separate them from the bulk of the water in the solution. The water is discharged at the base of the first column and flows through a heat exchanger 6 where it gives up its heat to the solution to be distilled, or to some other liquid.

The distillate vapors which may be concentrated by reducing their percentage of water, are liquefied in a condenser and gas separator 5, 9 where non-condensable gases, if any, are eliminated. The hot condensate from the condenser 5 is immediately conducted to the rectification-plant in which the mixture is decomposed as follows:

If the initial product is mash, the principal constituent of the crude condensate is butyl alcohol which is separated in the second or butyl column 13. In this column, acetone and ethyl alcohol, with a small percentage of water and butyl alcohol, are rectified and distilled away from the column 13 in upward direction, while butyl alcohol and water, being higher-boiling constituents, are concentrated in downward direction and finally, substantially free from acetone and ethyl alcohol, collect in a container 26, with a closed bottom plate 24, at the centre of the column 13.

In this container the liquid decomposes into an upper layer consisting principally of butyl alcohol, and a lower, principally watery layer. The upper layer is discharged into the lower portion of the column 13 below the bottom plate 24, by an overflow pipe 27. In this lower portion of the column, the liquid which contains but little water, is decomposed by rectification into an azeotropic mixture of butyl alcohol and water, and waterfree butyl alcohol. The vapor of the mixture is returned to the container by a pipe 28 and the waterfree butyl-alcohol vapor, or the butyl alcohol in liquid condition, is conducted to a condenser 30 through pipe 29.

The lower layer of liquid in the container is a saturated solution of butyl alcohol in water, with only small quantities of ethyl alcohol and acetone. This saturated solution is returned to the first column 1 through a pipe 31 but may also be delivered to the fourth or ethyl-alcohol column 61.

The method as described has important advantages over what is old. A considerable portion of the water in the crude distillate is removed in liquid condition and without expenditure of heat for its evaporation. Condensers and separators for decomposing or liquefaction of the azeotropic butyl-alcohol-water distillate are not required. The latent heat of the butyl-alcohol water vapor which flows into the container 26 through pipe 28 from the lower portion of column 13, is directly utilized for heating the upper portion of the column. The liquid which decomposes into two layers in the container 26, is delivered to the subsequent stages without loss of heat. At the head of the butyl alcohol column 13, the acetone and the ethyl alcohol, as mentioned, are distilled away with traces of butyl alcohol and water. Normally, this mixture which is decomposed in the subsequent stages of the process, is only about ⅓ of the crude distillate from mash of normal composition. Therefore the preparation of pure acetone and ethyl alcohol according to my method requires a smaller plant and lower operation cost than the old methods in which the butyl alcohol is separated only in the last stage.

The distillate from the upper portion of the butyl alcohol column 13 is delivered to the third or acetone column 39 directly or through a condenser 34. In the column 39, the acetone is separated and rectified and delivered to a condenser 51 in vapor condition. A portion of the condensate from 51 is returned to the column 39 through pipe line 54 while the balance is discharged through pipe 60 as the finished product. If required, the distillate can be subjected to further rectification.

From the bottom of the acetone column 39, the acetone-free residue is conducted to the ethyl alcohol column 61 where the ethyl alcohol is distilled away and rectified. The condensers 63, 64 of this column deliver high-grade ethyl alcohol. The residual water quite free from valuable materials, flows from the lower portion of the column 61. Only a small percentage of butyl alcohol gets into the ethyl-alcohol column 61 with the distillation residue from the acetone column 39 and the butyl alcohol is concentrated in a definite zone. The concentrated mixture collects in a container 74 with a bottom plate 73 where it decomposes into two layers. The upper layer is extracted through pipe 75 and delivered to the butyl alcohol column 13 at its top.

It will be understood from this brief description that only pure products are obtained by the cycle. The water from the initial product, slop, singlings water, etc., are discharged free from acetone, ethyl and butyl alcohol.

If there are still other substances in the crude mixture or in the mash, the purification method may be extended with respect to these. For instance, if higher alcohols are present, the product from the base of the butyl alcohol column 13 is directly delivered to a column (not shown) in which the butyl alcohol is continuously distilled away from the higher-boiling components. Similarly, if impurities such as higher ketones are present in the ethyl alcohol from the plant, the alcohol may be purified by further rectification.

Intermediate distillates may be treated chemically, for instance, with alkaline substances from reservoirs 15, 16.

The plant, which has been briefly described for illustrating my method, will now be described in full detail.

The watery solution which is the initial product, is stored in a reservoir 2 from which it is conducted to the plant through a pipe 4. Instead of a gravity reservoir, a pump 3 may be provided which conveys the liquid from some low-level reservoir, such as a fermentation vat (not shown) and delivers it to the gravity reservoir 2 through pipe line 400, 401 or to a pipe 402 to which the gravity pipe 4 is connected. The pipe 402 delivers the liquid to the condenser 5 of the first column 1 where it exchanges heat with crude distillate from the column 1. From the top of the condenser 5, the liquid flows to a heat exchanger 6 through pipe 403. The heat exchanger is supplied with hot liquid from the base of column 1 through a pipe 7. The liquid in the pipe 7 which may be slop is entirely without acetone, ethyl and butyl alcohol and delivers a portion of its heat to the initial liquid or mash.

The base of column 1 is heated by steam. From its top where the crude distillate is concentrated, a spirit pipe 8 extends to the condenser 5, with its gas separator 9. The vapor from the column 1 is condensed in 5 and non-condensable gas is separated in 9 and discharged through a pipe 10. A portion of the condensate from condenser 5 and separator 9 is returned to the column 1 through pipe 11 and pipe 110, respectively, and the balance is conducted to the butyl alcohol column 13 through pipes 12, 120 and 121, respectively. A neutralizer 22 is inserted between the pipes 120 and 121. 14 are regulating valves in the pipes 12 and 120.

For neutralizing volatile acids, lye from the reservoirs 15 and 16 may be conducted to the columns or to intermediate distillates which are free from carbon dioxide. The lye may be conducted directly to the individual columns 1, 13, 39 and 61, through pipes 17, 18, 19, 20 and 21, respectively, with suitable shut-off valves, or it may be conducted to any desired number of neutralizers such as 22 through pipe 23.

The mixture delivered to the butyl alcohol column 13 is decomposed in the top portion of the column, above the bottom plate 24. The decomposition results in the formation of a distillate consisting mainly of acetone and ethyl alcohol and containing but little butyl alcohol and water, and a mixture of butyl alcohol and water which is substantially free from acetone and ethyl alcohol. This mixture is delivered to the container 26 through pipe 25. Here, it forms two layers. The upper layer which is rich in butyl alcohol, is conducted to the indirectly heated base of the column 13 through a pipe 27, and the butyl alcohol is dehydrated by distilling away the azeotropic mixture of butyl alcohol and water. At the same time, any traces of acetone and ethyl alcohol are eliminated from the butyl alcohol.

The distillate vapor from the lower portion is conducted to the upper part of the column by a spirit pipe 28 on top of the bottom plate to the container 26. The waterfree butyl alcohol is conducted to the condenser 30 through a pipe 29 from the bottom of column 13. The lower layer of the liquid in the container 26 returns to the first column 1 through a pipe 31 with a regulating valve 32.

From the top of the butyl alcohol column 13, the distillate vapor is conducted to a condenser 34 through spirit pipe 33, and from this partly to a separator 35 with a vent pipe 36. The condensate from 34 and 35 partly returns to column 13 through pipes 37 and the balance is conducted to the acetone column 39 through pipes 38. 40 are regulating valves in the pipes 38. A by-pass pipe 41 connects the spirit pipe 33 directly to the acetone column so that when the valve 42 is closed and the valve 43 opened, the distillate vapor flows directly to column 39. The rectified acetone vapor is conducted to a condenser 51 through a spirit pipe 50, with a separator 53 and vent pipe 52. The acetone-free residual liquid is discharged from the base of the column 39 and conducted to the ethyl-alcohol column 61, through a pipe 44. For bringing about a more effective separation, the acetone column 39 has an intermediate condenser 45. A partition 46 (closed bottom plate) in the column causes the vapor to leave the column through pipe 47 and to flow through the intermediate condenser 45. After having been separated from the condensate which is rich in high boiling-components, the vapor is returned to the column 39 above the partition 46 through pipe 48. The portion of the distillate which has been liquefied in the intermediate condenser 45, is returned to the column 39 through pipe 49 below the partition 46.

The condensate from the acetone vapor is partly returned to the column 39 through pipes 54, a portion of the condensate from condenser 51 flows to a cooling coil 56 through a pipe 55 and leaves the coil through a pipe 58 with a regulating valve 57. From the separator 53, condensate may be returned to the column 1 through pipe 59 while condensate may be discharged through pipe 60.

The acetone-free residue through pipe 44 gets into the steam-heated ethyl-alcohol column 61 from which the rectified vapor is discharged through the spirit pipe 62 and condensed in the condenser 63 and the separator 64, with vent pipe 65. A portion of the condensate is returned to the column 61 through pipe 66. From the condenser 63, a portion of the condensate is conducted to the coil 56 which is in fact a double coil, through a pipe 67, and high-grade alcohol is delivered from the second coil through pipe 68 and valve 69. A pipe 70 which is connected to the separator 64, returns condensate to the acetone column 39. Through a pipe 71, this portion of the distillate can be returned to column 1 through pipe 59. A pipe 72 serves for discharging the condensate, if required.

The small quantity of butyl alcohol which gets into the column 61 through pipe 44, is concentrated in the central portion of the column where a container 74 with a bottom plate 73 is provided. The liquid which collects in the container 74, decomposes into two layers of which the upper one, rich in butyl alcohol, is permanently drained through pipe 75 and conveyed to the butyl alcohol column 13 through a pump (not shown). The lower, principally watery, layer flows through pipe 76 into the lower dealcoholizing portion of column 61 which is below the bottom plate 73. The distillate vapor from this lower portion of the column is delivered to the container 74 through a spirit pipe 77 above the liquid level. The singlings water flows from the base of the column 61 through pipe 78.

If it is desired to work the liquid of the lower layer in container 26 in the column 61, a connection may be established between 26 and 61 through pipes 31 and 79, with suitable shut-off valves.

It will be understood that my method is direct and continuous.

I claim:

1. A process for directly and continuously preparing in the pure state acetone, ethyl alcohol and butyl alcohol from mashes of butyl alcohol-acetone-ethyl alcohol fermentation comprising continuously distilling a butyl alcohol-acetone-ethyl alcohol-water mixture from said mashes, separating the condensate by further distillation into a mixture of vapors rich in acetone and ethyl alcohol and into a butyl alcohol-rich liquid, separating said liquid into an upper layer rich in butyl alcohol and a lower layer rich in water, rectifying said upper layer rich in butyl alcohol to produce water-free butyl alcohol and a vaporous azeotropic mixture of butyl alcohol and water, and returning said vaporous azeotropic mixture to the process at the point of separation of said butyl alcohol-rich liquid into said upper and lower layers.

2. A process for directly and continuously preparing in the pure state acetone, ethyl alcohol and butyl alcohol from mashes of butyl alcohol-acetone-ethyl alcohol fermentation comprising continuously distilling a butyl alcohol-acetone-ethyl alcohol-water mixture from said mashes, separating the condensate by further distillation into a mixture of vapors rich in acetone and ethyl alcohol and into a butyl alcohol-rich liquid, separating said liquid into an upper layer rich in butyl alcohol and a lower layer rich in water, rectifying said upper layer rich in butyl alcohol to produce water-free butyl alcohol and a vaporous azeotropic mixture of butyl alcohol and water, returning said lower layer rich in water to said first distillation stage, and returning said vaporous azeotropic mixture to the process at the point of separation of said butyl alcohol-rich liquid into said upper and lower layers.

3. A process for directly and continuously preparing in the pure state acetone, ethyl alcohol and butyl alcohol from mashes of butyl alcohol-acetone-ethyl alcohol fermentation comprising continuously distilling a butyl alcohol-acetone-ethyl alcohol-water mixture from said mashes, separating non-condensable gas from the condensate, separating the condensate by further distillation into a mixture of vapors rich in acetone and ethyl alcohol and into a butyl alcohol-rich liquid, separating said liquid into an upper layer rich in butyl alcohol and a lower layer rich in water, rectifying said upper layer rich in butyl alcohol to produce water-free butyl alcohol and a vaporous azeotropic mixture of butyl alcohol and water, returning said lower layer rich in water to said first distillation stage, and returning said vaporous azeotropic mixture to the process at the point of separation of said butyl alcohol-rich liquid into said upper and lower layers.

4. A process for directly and continuously preparing in the pure state acetone, ethyl alcohol and butyl alcohol from mashes of butyl alcohol-acetone-ethyl alcohol fermentation comprising continuously distilling a butyl alcohol-acetone-ethyl alcohol-water mixture from said mashes, separating the condensate by further distillation into a mixture of vapors rich in acetone and ethyl alcohol and into a butyl alcohol-rich liquid, separating said liquid into an upper layer rich in butyl alcohol and a lower layer rich in water, rectifying said upper layer rich in butyl alcohol to produce water-free butyl alcohol and a vaporous azeothropic mixture of butyl alcohol and water, returning said vaporous azeotropic mixture to the process at the point of separation of said butyl alcohol-rich liquid into said upper and lower layers, separating the acetone by a third distillation stage from the mixture rich in acetone and ethyl alcohol, rectifying the acetone, and separating in a fourth distillation stage the acetone-free liquid residue into high grade ethyl alcohol and water.

5. A process for directly and continuously preparing in the pure state acetone, ethyl alcohol and butyl alcohol from mashes of butyl alcohol-acetone-ethyl alcohol fermentation comprising continuously distilling a butyl alcohol-acetone-ethyl alcohol-water mixture from said mashes, separating the condensate by further distillation into a mixture of vapors rich in acetone and ethyl alcohol and into a butyl alcohol-rich liquid, separating said liquid into an upper layer rich in butyl alcohol and a lower layer rich in water, rectifying said upper layer rich in butyl alcohol to produce water-free butyl alcohol and a vaporous azeotropic mixture of butyl alcohol and water, returning said vaporous azeotropic mixture to the process at the point of separation of said butyl alcohol-rich liquid into said upper and lower layers, separating the acetone by a third distillation stage from the mixture rich in acetone and ethyl alcohol, rectifying the acetone, separating in a fourth distillation stage the acetone-free liquid residue into high grade ethyl alcohol and water, and returning any butyl alcohol remaining from and enriched in said fourth distillation stage to the process at the point of separation of said butyl alcohol-rich liquid into said upper and lower layers.

6. A process for directly and continuously preparing in the pure state acetone, ethyl alcohol and butyl alcohol from mashes of butyl alcohol-acetone-ethyl alcohol fermentation comprising continuously distilling a butyl alcohol-acetone-ethyl alcohol-water mixture from said mashes, separating the condensate by further distillation into a mixture of vapors rich in acetone and ethyl alcohol and into a butyl alcohol-rich liquid, separating said liquid into an upper layer rich in butyl alcohol, and a lower layer rich in water, rectifying said upper layer rich in butyl alcohol to produce water-free butyl alcohol and a vaporous azeotropic mixture of butyl alcohol and water, returning said lower layer rich in water to said first distillation stage, returning said vaporous azeotropic mixture to the process at the point of separation of said butyl alcohol-rich liquid into said upper and lower layers, separating the acetone by a third distillation stage from the mixture rich in acetone and ethyl alcohol, rectifying the acetone, separating in a fourth distillation stage the acetone-free liquid residue into high grade ethyl alcohol and water, and returning any butyl alcohol remaining from and enriched in said fourth distillation stage to the process at the point of separation of said butyl alcohol-rich liquid into said upper and lower layers.

7. In apparatus for the continuous preparation of acetone, ethyl alcohol and butyl alcohol from a watery solution containing the same, in combination, a first distillation column for concentrating the solution by elimination of surplus water and non-condensable vapors from the solution, a second distillation column for receiving the concentrated solution and distilling therefrom the acetone and ethyl alcohol, a decanting chamber within said second distillation column for receiving the resulting mixture of butyl alcohol and water, a conduit connected with said chamber for conducting the upper layer of said last named mixture, containing principally butyl alcohol, to the part of said second column below said chamber, a conduit connected with said chamber for conducting the lower layer of said last named mixture, containing principally water to said first column, and a third distillation column for receiving the distillate of acetone and ethyl alcohol from said second column for distilling off the acetone therefrom.

8. In combination with the apparatus as described in claim 7, a vapor conduit connecting the portion of said second column below said decanting chamber with said decanting chamber.

GEORG REICHARDT.